(12) United States Patent
Kitano et al.

(10) Patent No.: US 11,524,640 B2
(45) Date of Patent: Dec. 13, 2022

(54) POWER SUPPLY APPARATUS

(71) Applicant: HONDA MOTOR CO., LTD., Tokyo (JP)

(72) Inventors: Ryo Kitano, Saitama (JP); Ryo Fujii, Saitama (JP); Hiroo Yamaguchi, Saitama (JP); Atsushi Nakano, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 291 days.

(21) Appl. No.: 16/939,073

(22) Filed: Jul. 27, 2020

(65) Prior Publication Data

US 2021/0031710 A1 Feb. 4, 2021

(30) Foreign Application Priority Data

Jul. 31, 2019 (JP) .............................. JP2019-140690

(51) Int. Cl.
| | |
|---|---|
| *B60R 16/02* | (2006.01) |
| *B60R 16/023* | (2006.01) |
| *H02G 3/16* | (2006.01) |
| *H01R 13/62* | (2006.01) |
| *H01H 85/20* | (2006.01) |

(Continued)

(52) U.S. Cl.
CPC .......... *B60R 16/0238* (2013.01); *B60K 1/04* (2013.01); *H01H 85/20* (2013.01); *H01M 50/20* (2021.01); *H01R 13/62* (2013.01); *H02G 3/16* (2013.01); *B60K 2001/0438* (2013.01); *H01H 2085/2065* (2013.01); *H01R 2201/26* (2013.01)

(58) Field of Classification Search
CPC ...... B60R 16/0238; H01M 50/20; B60K 1/04; B60K 2001/0438; H01R 2201/26
USPC .......................................................... 439/34
See application file for complete search history.

(56) References Cited

U.S. PATENT DOCUMENTS

| | | | |
|---|---|---|---|
| 5,785,532 A * | 7/1998 | Maue ................. | B60R 16/0238 439/949 |
| 6,437,245 B1 * | 8/2002 | Hayashi ............. | H01R 13/6593 439/364 |

(Continued)

FOREIGN PATENT DOCUMENTS

| | | |
|---|---|---|
| CN | 108973710 A | 12/2018 |
| JP | 2001135419 A | 5/2001 |

(Continued)

*Primary Examiner* — Alexander Gilman
(74) *Attorney, Agent, or Firm* — CKC & CO Partners Co., LLC

(57) ABSTRACT

A power supply apparatus includes a battery pack for an electric vehicle, and an interface unit that couples the battery pack and a plurality of electrical devices. The interface unit includes a branch connector provided with a coupling unit and a plurality of fuses. The coupling unit allows coupling wires to join. Each of the coupling wires is coupled to a corresponding one of electrical devices. Each of the plurality of fuses is disposed in a corresponding one of coupling wires. The interface unit also includes a battery pack connector that is able to be coupled to the branch connector. In a state in which the branch connector is coupled to the battery pack connector, the power supply apparatus is configured to be able to supply electric power from the battery pack to each of the plurality of electrical devices via the coupling unit.

4 Claims, 5 Drawing Sheets

(51) Int. Cl.
  *B60K 1/04*   (2019.01)
  *H01M 50/20*  (2021.01)

(56) References Cited

U.S. PATENT DOCUMENTS

| | | | | |
|---|---|---|---|---|
| 2004/0155749 | A1* | 8/2004 | Fujii | H01H 85/2035 337/187 |
| 2007/0172723 | A1* | 7/2007 | Chen | H01M 10/052 429/61 |
| 2009/0314511 | A1* | 12/2009 | Hagi | H01R 9/0512 174/78 |
| 2014/0159482 | A1* | 6/2014 | Satake | H02J 7/14 307/11 |
| 2014/0178737 | A1* | 6/2014 | Obrist | H01M 10/6554 429/120 |
| 2015/0280336 | A1* | 10/2015 | Itou | H01R 11/287 439/625 |
| 2018/0345820 | A1* | 12/2018 | Hatami | B60L 53/22 |
| 2019/0089086 | A1 | 3/2019 | Muramatsu et al. | |
| 2019/0126863 | A1* | 5/2019 | Naganishi | B60R 16/02 |
| 2019/0181600 | A1* | 6/2019 | Kawakami | B60L 50/00 |
| 2019/0372068 | A1 | 12/2019 | Naito et al. | |
| 2021/0031710 | A1* | 2/2021 | Kitano | H01M 50/249 |
| 2021/0061115 | A1* | 3/2021 | Honjo | B60L 3/0023 |
| 2021/0098762 | A1* | 4/2021 | Yokota | H01M 50/583 |
| 2021/0268975 | A1* | 9/2021 | Hagi | H01M 50/249 |

FOREIGN PATENT DOCUMENTS

| | | |
|---|---|---|
| JP | 2004206910 A | 7/2004 |
| JP | 2006352967 A | 12/2006 |
| JP | 2008108699 A | 5/2008 |
| JP | 2013112237 A | 6/2013 |
| JP | 2018207591 A | 12/2018 |
| JP | 2019054642 A | 4/2019 |
| JP | 2019106770 A | 6/2019 |
| WO | 2018123577 A1 | 7/2018 |

* cited by examiner

POWER SUPPLY APPARATUS

This application is based on and claims the benefit of priority from Japanese Patent Application No. 2019-140690, filed on 31 Jul. 2019, the content of which is incorporated herein by reference.

BACKGROUND OF THE INVENTION

Field of the Invention

The present invention relates to a power supply apparatus in which a plurality of electrical devices is coupled to a battery pack.

Conventionally, in a battery pack used in an electric vehicle, a junction box having a fuse board is disposed inside the battery pack, and branching of high voltages is performed in the junction box in accordance with the number of electrical devices (for example, accessories). The same number of cables (coupling wires) as the number of branches are provided from the fuse board to an outlet of the battery pack. Further, the same number of connectors as the number of branches are also provided at the respective terminal ends of the cables at the outlet of the battery pack, thereby electrically coupling the battery pack with the plurality of electrical devices.

Patent Documents 1 to 4 disclose techniques related to fuses and connectors. Japanese Unexamined Patent Application Publication No. 2004-206910 (Patent Document 1) and Japanese Unexamined Patent Application Publication No. 2006-352967 (Patent Document 2) describe techniques relating to a connector provided with a fuse. Japanese Unexamined Patent Application Publication No. 2001-135419 (Patent Document 3) and Japanese Unexamined Patent Application Publication No. 2008-108699 (Patent Document 4) describe techniques for collecting a plurality of cables into one connector.

Patent Document 1: Japanese Unexamined Patent Application, Publication No. 2004-206910
Patent Document 2: Japanese Unexamined Patent Application, Publication No. 2006-352967
Patent Document 3: Japanese Unexamined Patent Application, Publication No. 2001-135419
Patent Document 4: Japanese Unexamined Patent Application, Publication No. 2008-108699

SUMMARY OF THE INVENTION

Advances in motorization have resulted in an increase in high-voltage electrical devices, which accordingly results in an increase in the number of branches of coupling wires drawing from a battery pack. In the prior art in which requiring to increase the cables and connectors to as many as the number of branches, there arises a problem of an increase in the number of components and a shortage of arrangement space. In addition, if the number of electrical devices changes depending on the vehicle type or grade (specification) of an electric vehicle, the number of branches of the coupling wires and the number of the connectors will increase or decrease. Therefore, for example, the structure of a lid of a portion of the battery pack from which the coupling wires are drawn needs to be established individually according to the vehicle type or grade, which causes high cost. Further, in order to perform maintenance of a fuse disposed inside a battery pack, it is necessary to remove the battery pack from the installation location in the electric vehicle and to open the cover of the battery pack. Therefore, there is room for improvement in terms of maintainability.

It is an object of the present invention to provide a power supply apparatus that can cope, without greatly changing the battery-pack related configurations, to differences in the vehicle type and grade of electric vehicles, and can realize high maintainability.

The first aspect of the present invention relates to, as an example embodiment, a power supply apparatus (for example, a power supply apparatus 1 to be described later) including a battery pack (for example, an IPU 10 to be described later) for an electric vehicle and an interface unit (for example, an interface unit 7 to be described later) that is configured to couple the battery pack and a plurality of electrical devices (for example, accessories 20*a*, 20*b*, 20*c*, 20*d*, 20*e* to be described later) to each other. The interface unit includes a branch connector (for example, a branch connector 30 to be described later) provided with a coupling unit (for example, a coupling unit 25 to be described later) and a plurality of fuses (for example, fuses 31 to be described later). The coupling unit allows coupling wires (for example, branch cables 50 to be described later) to join. Each of the coupling wires is coupled to corresponding one of the plurality of electrical devices. Each of the plurality of fuses is disposed to corresponding one of the coupling wires. The interface unit also includes a battery connector (for example, an IPU connector 120 to be described later) that is configured to be electrically coupled to a battery (for example, a battery 11 to be described later) of the battery pack and coupled to the branch connector. In a state in which the branch connector is coupled to the battery connector, the power supply apparatus is configured to be able to supply electric power from the battery to each of the plurality of electrical devices via the coupling unit.

This makes it possible to collectively perform operation of coupling and releasing between the battery-pack related configurations, and each of the plurality of electrical devices, simply by inserting and removing the branch connector. This improves workability. Further, even when the number of accessories differs depending on vehicle type or grade of a vehicle, it is possible to cope with the differences only by changing the configuration of the branch connector. This eliminates the need for individually preparing the specifications of the battery pack. This improves manufacturability. In addition, the location of the coupling wires pulled out from the battery pack is able to be gathered in one place. This makes it possible to realize space saving.

According to the second aspect, in the power supply apparatus according to the first aspect, it is preferable that the battery pack is installed below a floor (for example, a floor 3 to be described later) of the electric vehicle, and the battery connector is disposed on a side face (for example, a side wall 111 to be described later) of the battery pack, and the branch connector is configured to enable insertion and removal relative to the battery connector in a horizontal direction.

This makes it possible to smoothly insert and remove the branch connector into and from the battery connector even when the battery pack is disposed below the floor.

According to the third aspect, in the power supply apparatus according to the first aspect or the second aspect, it is preferable that a portion or all of the battery connector is installed inside of the battery pack, and the branch connector is configured to be insertable and removable from outside of the battery pack.

This makes it possible to perform operation of inserting and removing the branch connector from the outside of the battery pack externally without removing the connector from the installation location or disassembling the connector. In addition, an electric power branching unit requiring branching off is able to be disposed inside the battery pack, which makes it possible to reduce portions that protrude outside the battery pack. This makes it possible to improve the layout.

According to the fourth aspect, the power supply apparatus according to any one of the first aspect to the third aspect, it is preferable that a coupling connector (for example, a connector 51 to be described later) is disposed to the coupling wire at an end thereof which is on an opposite side to a side of the coupling unit.

This makes it is possible to suppress increase in size of the branch connector itself.

According to the power supply device of the present invention, it is possible to cope, without greatly changing the battery-pack related configurations, to differences in the vehicle type and grade of electric vehicles, and it is also possible to realize high maintainability.

DETAILED DESCRIPTION OF THE INVENTION

Figure 1:
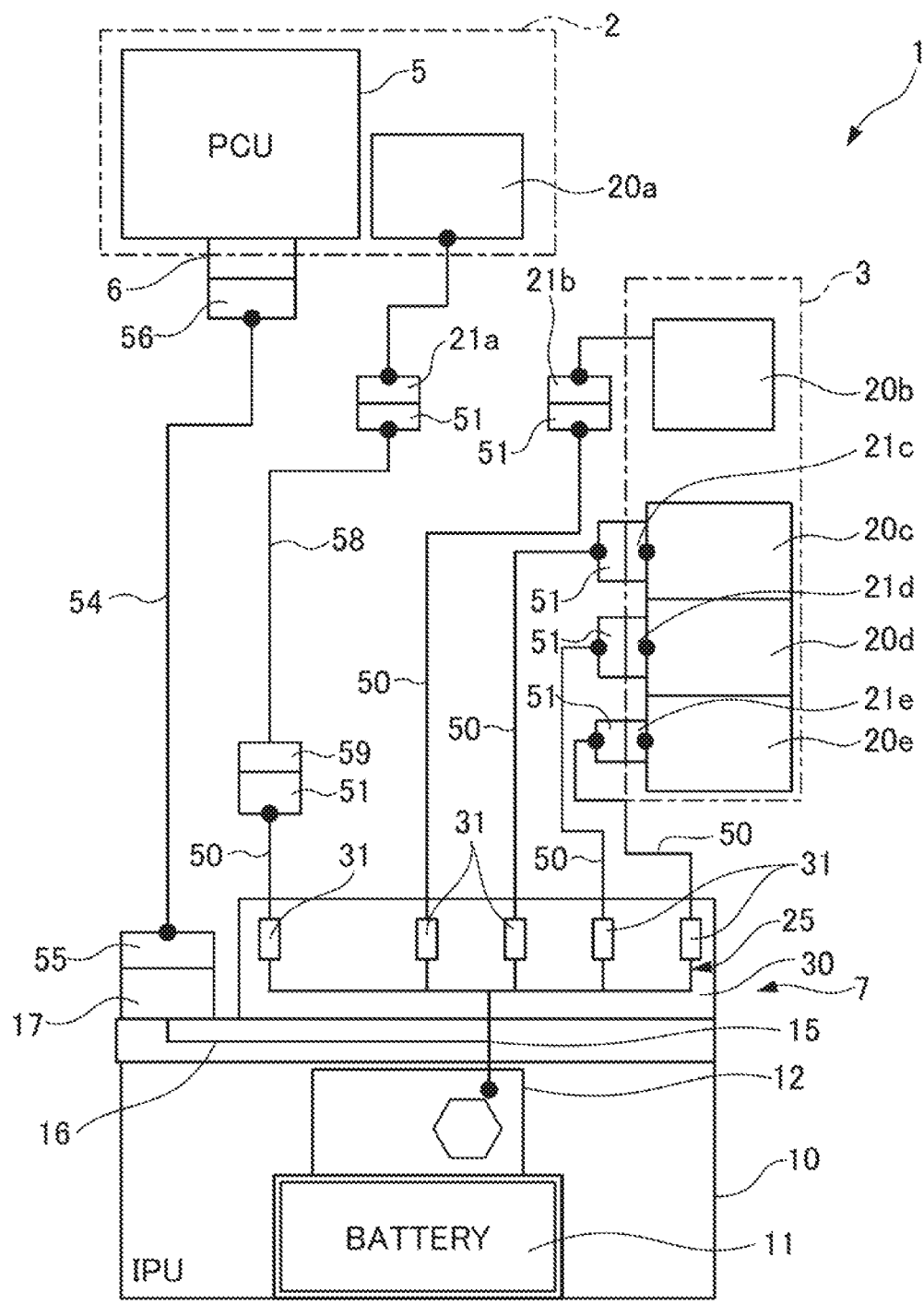
FIG. 1 is a diagram schematically illustrating an electrical connection relationship of a power supply apparatus for an electric vehicle according to an embodiment of the present invention.

Hereinafter, preferred embodiments of the present invention will be described with reference to the drawings. FIG. 1 is a diagram schematically illustrating an electrical connection relationship of a power supply apparatus 1 for an electric vehicle according to an embodiment of the present invention.

As illustrated in FIG. 1, the power supply apparatus 1 according to the present embodiment is used to supply electric power to electrical devices disposed in an engine room 2 or at a floor 3 of a vehicle. The power supply apparatus 1 according to the present embodiment includes an IPU (Intelligent Power Unit) 10 and an interface unit 7 for coupling a plurality of accessories 20a, 20b, 20c, 20d, and 20e with the IPU 10. The electric power is supplied to the plurality of accessories.

The IPU 10 is a battery pack for the driving of an electrical vehicle (vehicle). The IPU 10 includes a battery 11 and a junction box 12. Coupled to the junction box 12 are a connector cable 15 coupled to the interface unit 7, and a PCU connector cable 16 branched from the connector cable 15 and coupled to a PCU connector 17.

A connector 55 is coupled to the PCU connector 17. The connector 55 is provided at one end of the PCU cable 54. A connector 56 is coupled to a connector 6 of a PCU (Power Control Unit) 5 disposed in the engine room 2. The connector 56 is provided at the other end of the PCU cable 54. The PCU 5 is electrically coupled to the IPU 10 without going through a branch connector 30.

The branch connector 30 is a high-voltage compatible coupling device that electrically couples the IPU 10 with the accessories 20a to 20e. The accessory 20a is, for example, an A/C compressor disposed in the engine room 2, and includes a device connector 21a. The device connector 21a is coupled to a connector 51. The connector 51 is provided at one end of an intermediate cable 58. A connector 59 is provided at the other end of the intermediate cable 58. The connector 59 corresponds to the connector 51 of a branch cable 50, which will be described later.

The accessories 20b to 20e are disposed at the floor 3. The device (i.e., device-side) connectors 21b to 21e are coupled to corresponding one of the connectors 51 of the branch cable 50 described later.

The branch connector 30 includes a coupling unit 25 that electrically couples the battery 11 with the accessories 20a to 20e. The plurality of branch cables 50 are collected at the coupling unit 25.

Each of the plurality of branch cables 50 which have branched is electrically coupled to one of the accessories 20a to 20e. Further, each of the branch cables 50 is separately provided at the battery 11 and at the corresponding one of the accessories 20a to 20e. This allows the battery 11 and the accessories 20a to 20e to be electrically coupled with each other via a high-voltage compatible fuse 31. The connector (i.e. a coupling connector) 51 is disposed at an end of the branch cable 50 outside of the branch connector 30. The connector 51 is coupled to a corresponding one of the device connectors 21a to 21e.

Figure 2:
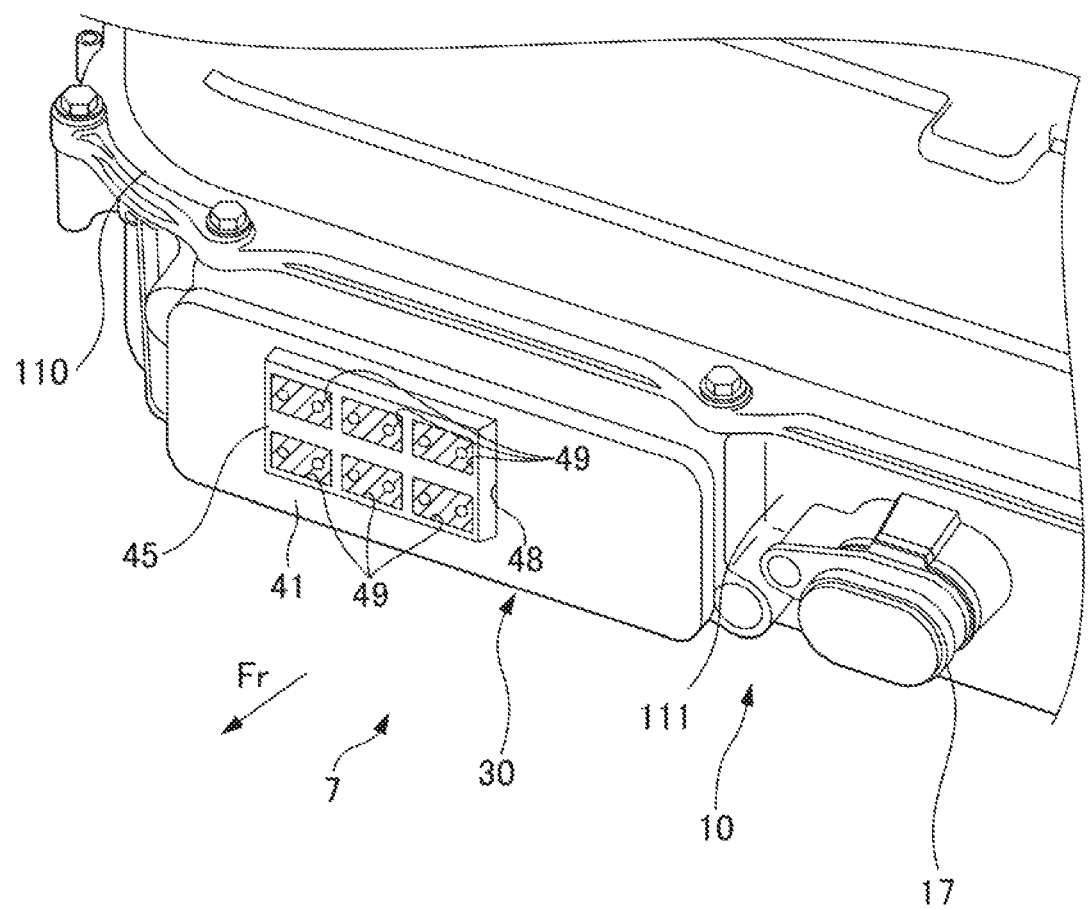
FIG. 2 is a perspective view of an IPU into which a branch connector of the present embodiment is inserted.
Figure 3:
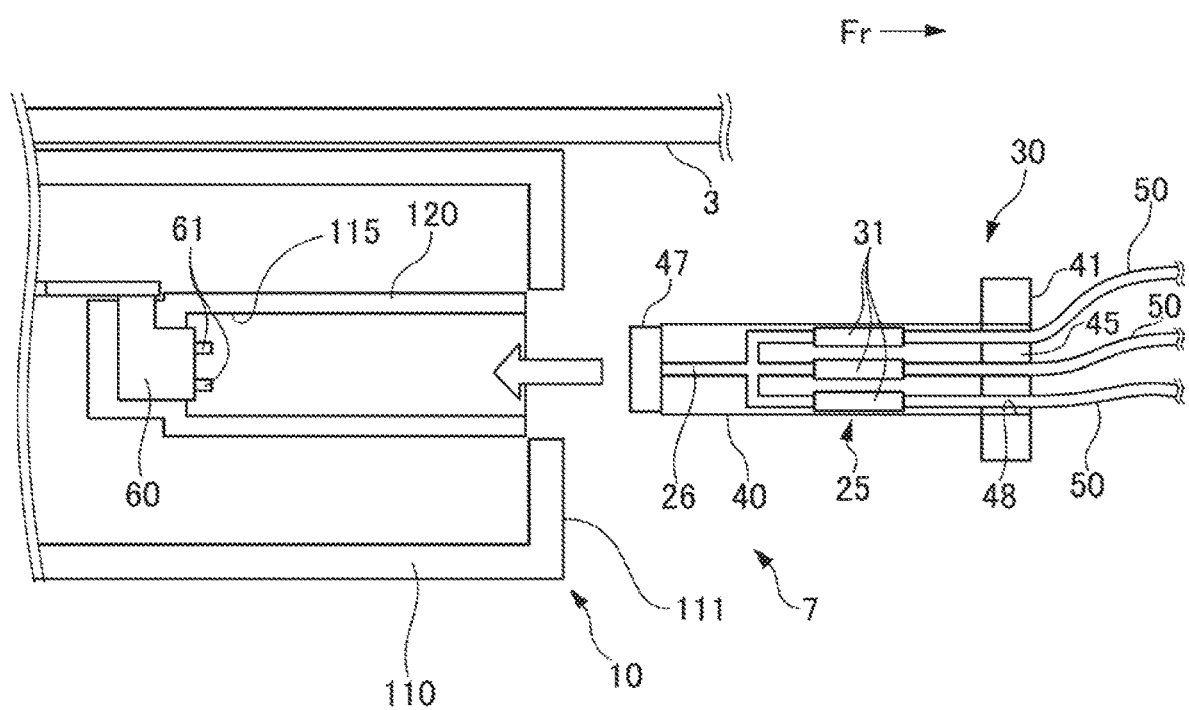
FIG. 3 is a schematic cross-sectional view of the branch connector and the IPU before insertion according to the present embodiment.
Figure 4:
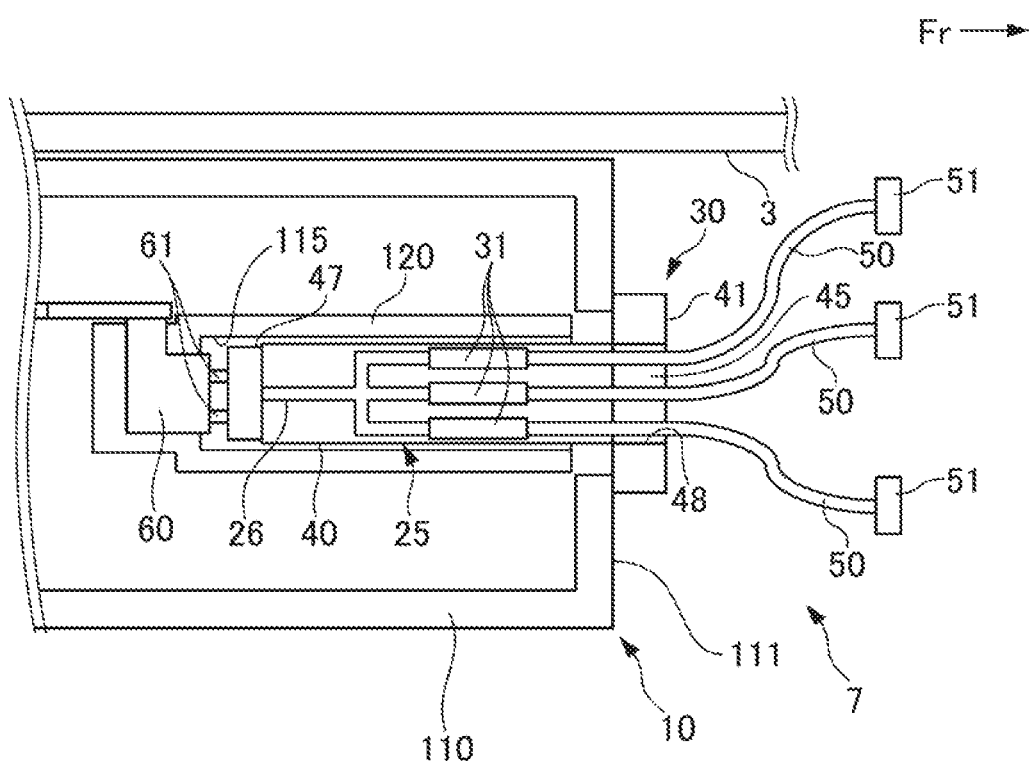
FIG. 4 is a schematic cross-sectional view of the branch connector and the IPU after insertion according to the present embodiment.

Next, a description is given of a structure of the branch connector 30 and the IPU 10 to which the branch connector 30 is coupled. FIG. 2 is a perspective view of the IPU 10 into which the branch connector 30 according to the present embodiment is inserted. It should be noted that, in FIG. 2, illustration of the branch cables 50 drawn to the outside of the IPU 10 is omitted. The IPU 10 will be described later. FIG. 3 is a schematic cross-sectional view of the branch connector 30 and the IPU 10 before insertion according to the present embodiment. FIG. 4 is a schematic cross-sectional view of the branch connector 30 and the IPU 10 after insertion according to the present embodiment. It should be noted that, in FIGS. 2 to 4, the symbol Fr denotes the front side of a vehicle.

The branch connector 30 illustrated in FIG. 2 is formed by integrating a high-voltage branching unit, a high-voltage fuse, and a connector unit. The branch connectors 30 according to the present embodiment are configured to be insertable and removable relative to the IPU 10 at a side wall 111 of a case 110.

An IPU connector 120 is formed on the side wall 111 of the case 110 of the IPU 10. The branch connector 30 is coupled to the IPU connector 120. The IPU connector 120 has a slot 115 that is in communication with the outside of the case 110 and extends in the horizontal direction. The branch connector 30 is inserted into the slot 115. The branch connector 30 is a male connector for the IPU 10. The IPU connector 120 is a female connector for the branch connector 30.

Inside the slot 115 of the IPU connector 120 according to the present embodiment, a connector coupling unit 60 to which the branch connector 30 is electrically coupled is provided.

The connector coupling unit 60 is located on the rear side of the slot 115, and is electrically coupled to the battery 11 via the junction box 12. The connector coupling unit 60 includes a plurality of fitting pins 61 extending toward the opening of the slot 115. Once the fitting pins 61 are fit with the branch connector 30, the branch connector 30 is coupled to the connector coupling unit 60.

As illustrated in FIGS. 3 and 4, the coupling unit 25 of the branch connector 30 is, for example, a high-voltage compatible power branching unit. The coupling unit 25 includes a main cable 26 coupled to the battery 11, and the plurality of branch cables 50 which are branched from the main cable 26. The number of the plurality of branch cables 50 corresponds to the number of the accessories 20a to 20d.

In addition to the coupling unit 25 and the fuse 31, the branch connector 30 according to the present embodiment further includes a housing (main body portion) 40, a flange portion (projecting portion) 41, a waterproof rubber stopper 45, and a slot fitting portion 47.

The housing 40 accommodates members such as the coupling unit 25 and the fuse 31 therein. The housing 40 is inserted into slots 115 and enclosed inside the IPU 1.0. The flange portion 41 is formed at one end in the longitudinal direction of the housing 40. The flange portion 40 is located outside the IPU 10 in a state in which the branch connector 30 is mounted to the IPU connector 120.

The waterproof rubber stopper 45 is an elastic member fitted into an opening 48 formed in the middle of the flange portion 41. The waterproof rubber stopper 45 has through holes 49. Each of the branch cables 50 coupled to corresponding one of the fuses 31 on the side thereof close to the accessories 20a to 20e extends through a corresponding one of the through holes 49, as illustrated in FIG. 2. The branch cable 50 inside the housing 40 is drawn outside of the branch connector 30 through the through hole 49 of the waterproof rubber stopper 45. The number of the through holes 49 of the waterproof rubber stopper 45 is set in accordance with the number of branches of the branch cables 50 in the housing 40, whereby it is possible to set the number of the through holes 49 to correspond to the increased or decreased number of the branches of the branch cables 50. For example, if the number of the accessories 20a to 20e to be coupled is five, five through holes 49 are used. If the number thereof is six, the waterproof rubber stopper 45 is so designed as to have six through holes 49, and draw the branch cables 50 out of the branch connector 30 using the six through holes 49.

The slot fitting portion 47 is disposed at the other end in the longitudinal direction of the housing 40. Once the fitting pin 61 of the connector coupling portion 60 is coupled to the slot fitting portion 47, the branch connector 30 enters a state mounted to the IPU connector 120.

As illustrated in FIG. 3, the branch connector 30 is inserted into the slot 115 of the IPU connector 120 from the front side in the horizontal direction. As illustrated in FIG. 4, the branch connector 30 is mounted to the slot 115, thereby allowing the branch connector 30 to be electrically coupled to the battery 11.

In the present embodiment, the IPU 10 is disposed below the floor 3 of the electric vehicle, for example. Even in such an arrangement, the branch connector 30 is configured to be insertable/removable relative to the IPU 10 in the horizontal direction. This allows for the insertion and removal of the branch connector 30 without removing the IPU 10 from the installation location.

Figure 5:
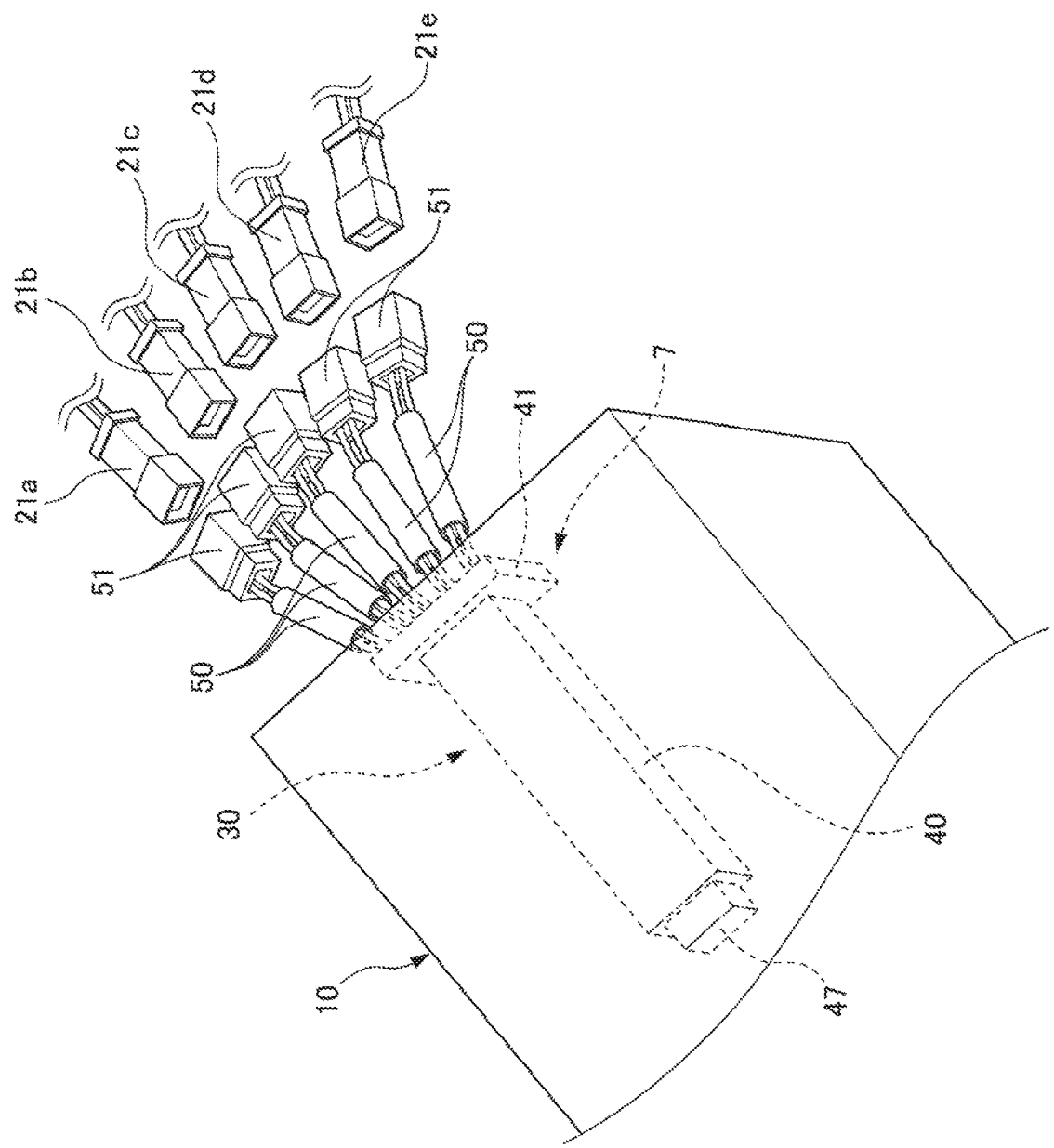
FIG. 5 is a schematic perspective view of connectors of branch cables pulled out from the branch connector and device connectors coupled to the branch connectors according to the present embodiment.

Next, a description is given of the electrical connection between the branch connector 30 and the accessories 20a to 20e. FIG. 5 is a schematic perspective view of the connectors 51 of the branch cable 50 drawn from the branch connector 30 according to the present embodiment and the device connectors 21a to 21e coupled to these connectors 51. FIG. 5 illustrates a state before the connectors 51 of the branch cables 50 are coupled to the device connectors 21a to 21e.

As illustrated in FIG. 5, the connectors 51 are disposed at the end of the branch cables 50 drawn from the branch connector 30. The device connectors 21a to 21e are coupled to the connectors 51, thereby electrically coupling the branch connectors 30 with the accessories 20a to 20e. This allows the battery 11 to be coupled to the accessories 20a to 20e via the coupling unit 25 of the branch connector 30, thereby making it possible to supply electric power from the battery 11 to the accessories 20a to 20e.

The power supply apparatus 1 according to the present embodiment described above includes the IPU (battery pack) 10 for an electric vehicle, and an interface unit 7 that couples the IPU 10 with the plurality of accessories (electrical devices) 20a to 20e. Further, the interface unit 7 includes a branch connector 30 provided with the coupling unit 25 and the plurality of fuses 31. The coupling unit 25 allows branch cables (coupling wires) 50 to join. Each of the branch cables 50 is coupled to a corresponding one of the plurality of accessories 20a to 20e. Each of the plurality of fuses 31 is disposed in a corresponding one of the branch cables 50. The interface unit 7 also includes the IPU connector 120 that is configured to be electrically coupled to the battery 11 of the IPU 10 and is connectable to the branch connector 30. In a state in which the branch connector 30 is coupled to the IPU connector 120, the power supply apparatus 1 is configured to be able to supply electric power from the battery 11 to each of the plurality of accessories 20a to 20e via the coupling unit 25. This makes it possible to collectively perform operations of coupling and releasing between the configuration including the IPU 10 and components close to the IPU 10 and each of the plurality of accessories 20a to 20e, simply by inserting or removing the branch connector 30. This improves workability. Further, even when the number of accessories differs depending on vehicle type or grade, it is possible to cope simply by changing the configuration of the branch connector 30. This eliminates the need for individually preparing the specifications of the IPU 10. This improves manufacturability. In addition, the location of the branch cables 50 drawn from the IPU 10 is able to be gathered in one place. This makes it possible to realize space savings.

Further, the IPU 10 of the power supply apparatus 1 of the present embodiment is installed below the floor 3 of the electric vehicle. Further, the IPU connector 120 is disposed on the side wall (side face) 111 of the IPU 10, and the branch connector 30 is configured to be inserted into and removed from the IPU connector 120 in a horizontal direction. This makes it possible to smoothly insert and remove the branch connector 30 relative to the IPU connector 120 even when the IPU 10 is installed below the floor 3 of the electric vehicle (vehicle).

Further, in the power supply apparatus 1 of the present embodiment, a portion or the entirety of the IPU connector 120 is installed inside the IPU 10, and the insertion and removal of the branch connector 30 is configured to be performed from the outside of the IPU 10. This makes it possible to perform operation of inserting and removing the branch connector 30 from the outside of the IPU 10 externally without removing the connector from the installation location or disassembling the connector. In addition, an electric power branching unit requiring branching off is able to be disposed inside the IPU 10, which makes it possible to reduce portions projecting outside of the IPU 10. This makes it possible to improve the layout.

Further, according to the power supply apparatus 1 of the present embodiment, a connector (coupling connector) 51 is disposed at an end of the branch cable 50 which is on the opposite side to the coupling unit 25 side thereof. This makes it possible to suppress an increase in the dimensions of the branch connector 30 itself.

Further, in the present embodiment, the PCU 5 serving as a circuit for vehicle driving is supplied with electric power from the IPU 10 not from the branch cable 50 drawn from the branch connector 30, but rather from the PCU cable 54. Since the circuit for a vehicle driving which has relatively high heat generation is thereby separated from the branch connector 30, it is possible to solve the problem of thermal feasibility accompanying integration and size reduction of the branch connector 30. In addition, it is possible to realize ease of assembly between the coupling portion in the PCU 5 where an attaching and detaching stroke cannot be made larger, and the branch connector 30 for the accessories 20a to 20e having a large attaching and detaching stroke.

Although preferred embodiments of the present invention are described above, the present invention is not to be limited to the embodiments described above, and can be modified as appropriate.

In the above embodiments, the path for supplying electric power to the PCU 5 is configured not to pass through the branch connector 30; however, the present invention is not limited to this configuration.

The configuration of the power supply apparatus 1 described in the above embodiments is merely an example, and the number, installation location, and the like of the accessories 20a to 20e serving as the electrical devices can be appropriately changed according to the vehicle type, grade, and the like.

EXPLANATION OF REFERENCE NUMERALS

1 power supply apparatus
7 interface unit
10 IPU (battery pack)
11 battery
20a, 20b, 20c, 20d, 20e accessories
25 coupling unit
30 branch connector
31 fuse
50 branch cable (coupling wire)
120 IPU connector (battery connector)

What is claimed is:

1. A power supply apparatus comprising:
   a battery pack for an electric vehicle; and
   an interface unit that is configured to couple the battery pack and a plurality of electrical devices to each other;
   the interface unit including:
   a branch connector provided with a coupling unit and a plurality of fuses, the coupling unit allowing coupling wires to join, each of the coupling wires being coupled to a corresponding one of the plurality of electrical devices, and each of the plurality of fuses being disposed to a corresponding one of the coupling wires, and
   a battery connector that is configured to be electrically coupled to a battery of the battery pack and coupled to the branch connector, wherein
   in a state in which the branch connector is coupled to the battery connector, the power supply apparatus is configured to supply electric power from the battery to each of the plurality of electrical devices via the coupling unit,
   all of the battery connector is installed inside of the battery pack,
   the battery connector includes a slot into which the branch connector is inserted, and
   the branch connector further includes a housing that accommodates the coupling unit and the fuses, the housing being inserted into the slot and enclosed inside the battery connector, the branch connector being configured to be insertable and removable from outside of the battery pack.

2. The power supply apparatus according to claim 1, wherein
   a coupling connector is disposed to the coupling wire at an end thereof which is on an opposite side to a side of the coupling unit.

3. The power supply apparatus according to claim 1, wherein
   the battery pack is installed below a floor of the electric vehicle, and
   the battery connector is disposed on a side face (111) of the battery pack, and the branch connector is configured to enable insertion and removal relative to the battery connector in a horizontal direction.

4. The power supply apparatus according to claim 3, wherein
   a coupling connector is disposed to the coupling wire at an end thereof which is on an opposite side to a side of the coupling unit.

* * * * *